United States Patent [19]

Sazaki

[11] 4,098,472
[45] Jul. 4, 1978

[54] SPIN FISHING REEL WITH ADJUSTABLE BAIL ARM RETURN SPRING

[75] Inventor: Kounin Sazaki, Fukuyama, Japan

[73] Assignee: Ryobi, Ltd., Fuchu, Japan

[21] Appl. No.: 772,883

[22] Filed: Feb. 28, 1977

[30] Foreign Application Priority Data

Mar. 3, 1976 [JP] Japan .............................. 51-25623[U]

[51] Int. Cl.² ............................................. A01K 89/01
[52] U.S. Cl. ............................... 242/84.2 G; 267/155; 267/177
[58] Field of Search ................ 242/84.2 G, 84.2 R, 242/84.21 R; 267/155, 177, 175

[56] References Cited

U.S. PATENT DOCUMENTS

| 2,498,987 | 2/1950 | Duncan | 242/84.21 R |
| 2,775,417 | 12/1956 | Freund | 242/84.21 |
| 2,836,375 | 5/1958 | Meulnart | 242/84.2 G |
| 3,270,725 | 9/1966 | Thompson | 267/155 X |

Primary Examiner—Billy S. Taylor
Attorney, Agent, or Firm—Sughrue, Rothwell, Mion, Zinn and Macpeak

[57] ABSTRACT

One end 10a of a bail arm return coil spring 10 mounted around a post 5 is extended into the bail mounting projection 4 on the side of the reel rotor 3. The extended end of the spring is given an L-shaped configuration and the down-turned end 11 of the spring is selectively engageable in any one of a plurality of accomodating holes 12, 12', 12" provided in the rotor housing wall 4a, whereby the biasing force applied by the bail arm spring may be quickly and easily changed.

4 Claims, 2 Drawing Figures

SPIN FISHING REEL WITH ADJUSTABLE BAIL ARM RETURN SPRING

BACKGROUND OF THE INVENTION

This invention relates to a return force controlling mechanism for the bail arm of a spin fishing reel.

In the prior art spinning reels the bail arm is pivotally mounted on rotor posts and biased toward a retrieve or rewind position by a torsion spring mounted around one of the posts. The biasing or spring force acting on the bail arm is constant and unchangeable, however, whereby the bail arm is sometimes returned with undue shock and impact, as during very warm weather when the lubricants are less viscous, or is not fully returned when released, as when the lubricants are hardened in cold weather or the frictional forces are increased owing to dirty or worn parts.

SUMMARY OF THE INVENTION

Accordingly, the pesent invention is directed to a spinning reel wherein the bail arm return spring is easily adjustable to thereby permit the biasing force applied to the bail arm to be controlled in accordance with weather conditions, the condition of the reel, a fisherman's individual preference, etc.

Briefly, and in accordance with the present invention, such adjustability is implemented by extending one end of the bail arm return coil spring into the bail mounting projection on the side of the reel rotor. The extended end of the spring is given an L-shaped configuration, wherein the down-turned end of the spring is selectively engageable in one of a plurality of accomodating holes provided in the rotor housing. Thus, as contrasted with the prior art, the biasing force applied by the bail arm spring may be quickly and easily changed without having to replace, for example, a weakened spring with a fresh or stronger one.

DETAILED DESCRIPTION OF THE PREFERRED EMBODIMENT

Figure 1:
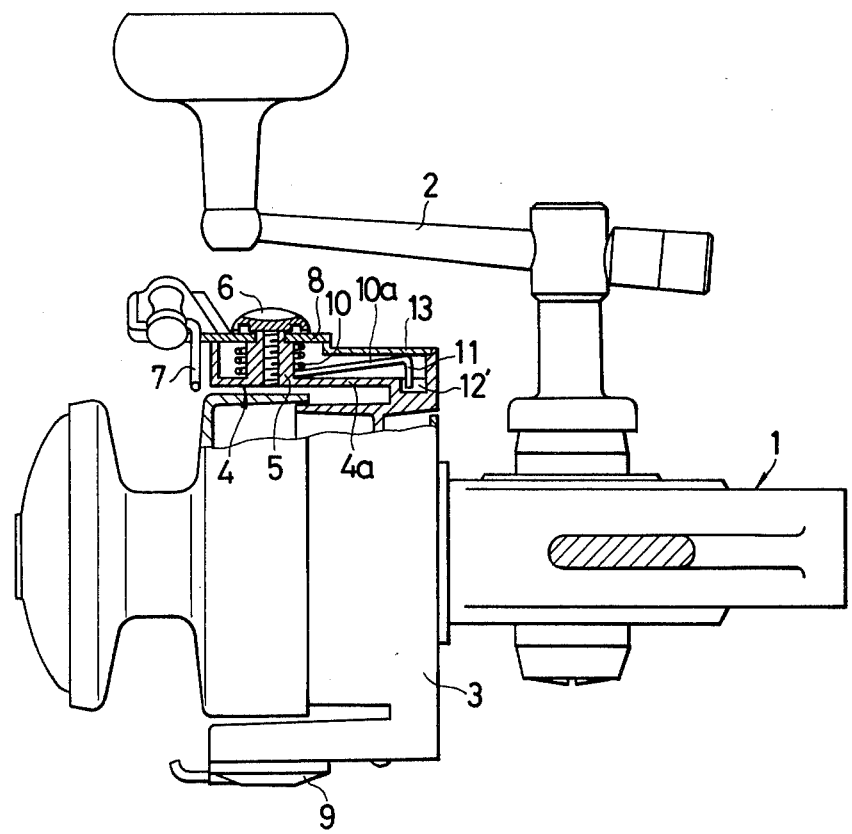
FIG. 1 shows a plan view of a spinning reel according to the present invention, in partial cutaway.
Figure 2:
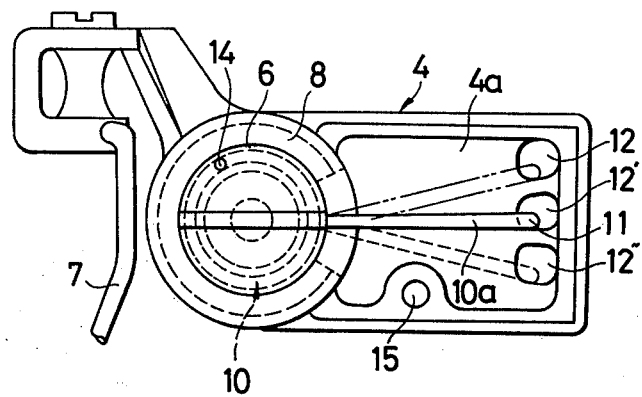
FIG. 2 shows an enlarged side view of the cutaway portion shown in FIG. 1.

Referring now to the drawings, a pair of bail supports 4 project outwardly from the diametrically opposite sides of a rotor 3 journalled in a reel body 1. The rotor may be reversably driven by a handle 2. The opposite ends of a bail arm 7 are secured to a spring plate 8 and a release cam 9, respectively, both journalled for rotation on pivot posts 5 upstanding from the bail supports 4. The plate 8 and cam 9 are held on the posts 5 by shouldered retaining screws 6, or the like, threaded into the posts. A coil spring 10 is disposed around a pivot post 5 within a bail support 4, one end of the spring being bent outwardly and engaged in a hole 14 in the spring plate 8 and the other end of the spring, after coiling or tensioning, being secured within the interior of the bail support 4. With such a construction, the bail arm is constantly biased in or toward its retrieval or rewind position, as illustrated in FIG. 1. To release or pay out the fishing line, as during casting, the bail arm is manually rotated about the pivot posts 5 approximately 180° to its release position, whereat it is latched by a locking device (not shown) incorporated in the cam 9.

The construction described thus far is all conventional and within the prior art. The modification according to the present invention provides a means for quickly and easily adjusting the tension of the coil spring 10 and thus the biasing force applied to a bail arm 7, as described below.

According to the present invention, theend of the spring 10 secured within the bail support 4 is extended and formed into an L-shape, including an elongated stem portion 10a and a downwardly bent, relatively shorter, locking portion 11. The locking portion 11 is selectively engageable in any one of a plurality of holes 12, 12', 12" provided in the bottom wall 4a of bail support 4. A cover plate 13 is adapted to fit over the exposed portion of the bail support 4 and is secured thereto by a screw (not shown) engageable with a threaded hole 15 in the bail support, thereby protecting the spring mechanism from dirt and contamination, and retaining the locking portion 11 of the spring 10 in the selected hole 12.

Thus, by simply removing the cover plate 13 the tension of the spring 10 can be easily adjusted by grasping the upwardly inclined stem portion 10a and engaging the locking portion 11 with a selected hole 12 — and then replacing the cover plate to retain the end of the spring in the selected tensioning hole. Of course, any number of holes 12 can be provided. In the embodiment shown, a normal spring tension results when the locking portion 11 is engaged in the hole 12', a stronger tension is provided by engaging the hole 12, as shown by the section lines, and weaker tension is obtained by engaging the hole 12", as shown by the dotted lines.

What is claimed is:

1. In a spin fishing reel including a reel body (1), a rotor (3) journalled for rotation in the body and drivenly engaged with a handle (2) mounted on the body, a pair of diametrically opposite support members (4) on the rotor, a pivot post (5) extending radially outwardly from each support member, bail arm means (6, 7, 8, 9) pivotally mounted on and extending between the posts, and a coil spring (10) mounted around one of the posts, one end of the spring being engaged with the bail arm means and the other end of the spring being engaged with the support member of said one post, whereby the spring biases the bail arm means toward a line retrieval position, spring tension adjustment means characterized by:
    (a) a plurality of circumferentially spaced spring end engagement means (12) disposed in said support member, and
    (b) said other end of the spring being configured to be selectively engageable with one of the spring end engagement means.

2. A spin fishing reel as defined in claim 1, wherein said other end of the spring includes an elongated stem portion (10a) extending radially outwardly from the spring coil, and a locking portion (11) downwardly bent from the free end of the stem portion, whereby said other end of the spring has an L-shape, and wherein the radial distance of the locking portion from the coil axis coincides with the radial distance of the engagement means therefrom.

3. A spin fishing reel as defined in claim 1, wherein the engagement means comprises holes defined in said support member, and further comprising a cover plate (13) adapted to be mounted on said support member for protecting the coil spring and for retaining said other end thereof in a selected engagement means.

4. A spin fishing reel as defined in claim 2, wherein the engagement means comprises holes defined in said support member, and further comprising a cover plate (13) adapted to be mounted on said support member for protecting the coil spring and for retaining said other end thereof in a selected engagement hole.

* * * * *